United States Patent
Kubota

(10) Patent No.: US 11,241,862 B2
(45) Date of Patent: Feb. 8, 2022

(54) LAMINATION SHEET AND INSERT MOLDING BODY

(71) Applicant: SEIREN CO., LTD., Fukui (JP)

(72) Inventor: Harukazu Kubota, Fukui (JP)

(73) Assignee: SEIREN CO., LTD.

(*) Notice: Subject to any disclaimer, the term of this patent is extended or adjusted under 35 U.S.C. 154(b) by 55 days.

(21) Appl. No.: 16/585,381

(22) Filed: Sep. 27, 2019

(65) Prior Publication Data

US 2020/0101693 A1   Apr. 2, 2020

(30) Foreign Application Priority Data

Sep. 28, 2018 (JP) .............................. JP2018-185552

(51) Int. Cl.
| | | |
|---|---|---|
| B32B 27/08 | (2006.01) | |
| B32B 7/027 | (2019.01) | |
| B32B 7/023 | (2019.01) | |

(52) U.S. Cl.
CPC .............. B32B 7/027 (2019.01); B32B 7/023 (2019.01); B32B 27/08 (2013.01); *B32B 2250/04* (2013.01); *B32B 2250/24* (2013.01); *B32B 2307/306* (2013.01); *B32B 2307/732* (2013.01)

(58) Field of Classification Search
CPC ... B32B 1/00; B32B 2250/04; B32B 2250/24; B32B 2307/306; B32B 2307/732; B32B 27/08; B32B 7/023; B32B 7/027
See application file for complete search history.

(56) References Cited

U.S. PATENT DOCUMENTS

2008/0200333 A1* 8/2008 Gotou .................. H05K 9/0096
                                                503/225

FOREIGN PATENT DOCUMENTS

| JP | 2002113738 A | 4/2002 |
| JP | 2004181666 A | 7/2004 |
| JP | 2011140201 A | 7/2011 |
| JP | 2014104673 A | 6/2014 |
| JP | 2014201008 A | 10/2014 |

OTHER PUBLICATIONS

Search Report from First Office Action for Chinese Application No. 2019109162771 dated Apr. 15, 2021; 3 pages.

* cited by examiner

*Primary Examiner* — Lawrence D Ferguson
(74) *Attorney, Agent, or Firm* — Lerner, David, Littenberg, Krumholz & Mentlik, LLP

(57) ABSTRACT

A lamination sheet includes a first layer, a second layer, and a third layer. The first layer is a layer made of resin and having optical transparency. The second layer is a layer made of resin and provided on the back side of the first layer. The third layer is a layer made of resin and provided on the back side of the second layer. The first layer is a layer, the thickness of which 188 μm or larger. The second layer is a patterned layer. The third layer is a layer, the thermal resistance value of which is higher than the thermal resistance value of the second layer.

20 Claims, 2 Drawing Sheets

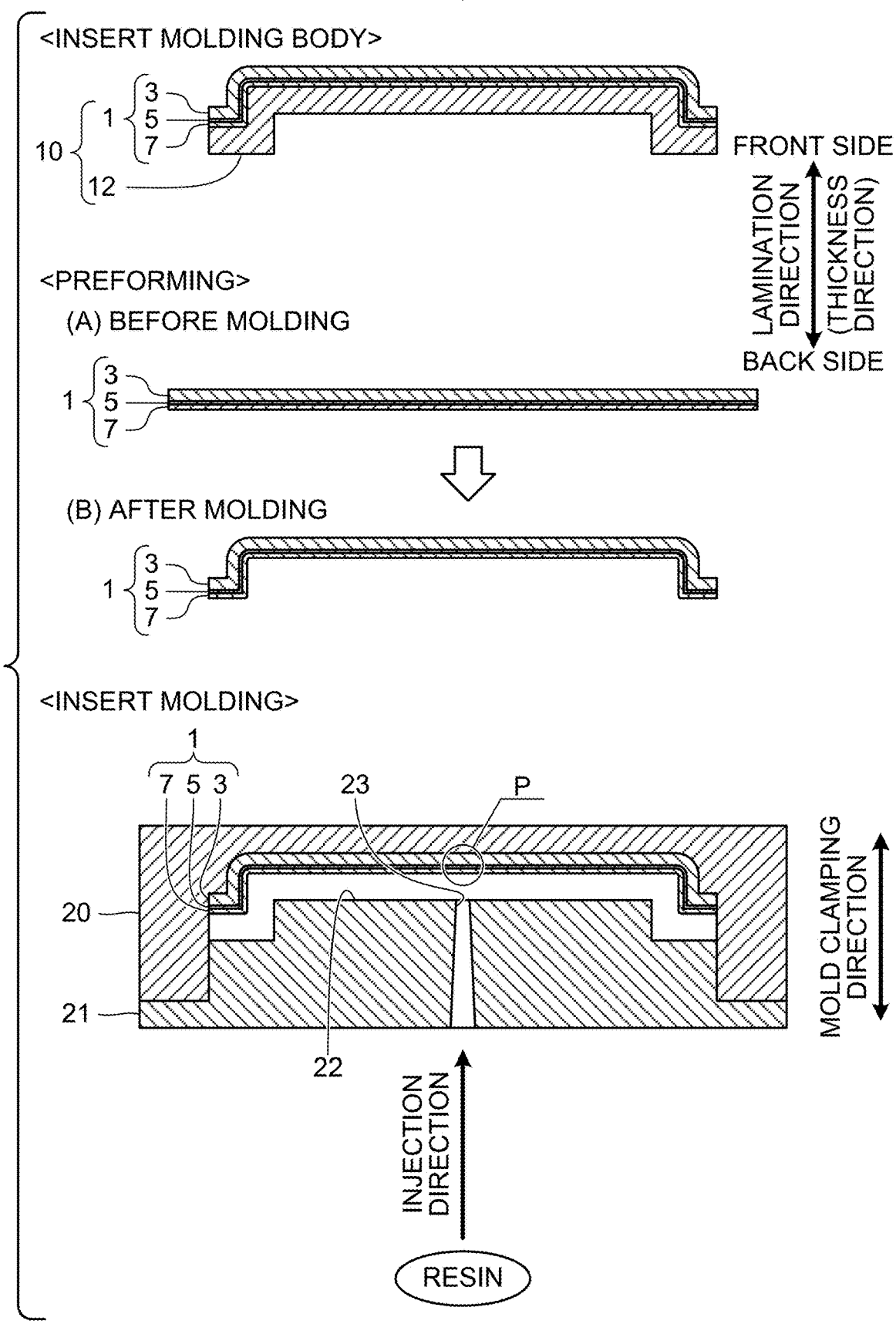

LAMINATION SHEET AND INSERT MOLDING BODY

CROSS-REFERENCE TO RELATED APPLICATION

This application claims the benefit of the filing date of Japanese Patent Application No. 2018-185552, filed Sep. 28, 2018, the entire contents of which are hereby incorporated by reference herein.

BACKGROUND OF THE INVENTION

Technical Field

The present disclosure relates to a lamination sheet made of resin, and an insert molding body including the lamination sheet.

Background Art

The applicant of the present application proposes a laminated sheet in Japanese Patent Application Laid-Open No. 2014-201008. In the lamination sheet, a patterned layer and a colored layer are sequentially laminated on one surface of a resin layer. The resin layer has optical transparency. The patterned layer is made of ionizing radiation curable resin and has optical transparency. The resin layer does not contact the colored layer. In the patterned layer, the thickness continuously changes. In the patterned layer, the cross-sectional area is different between a plurality of sections parallel to each other. The lamination sheet is integrated with a front surface of a molding body by a film insert molding method. In the molding body, the resin layer is the outermost surface.

Japanese Patent Application Laid-Open No. 2002-113738 discloses a simultaneous molding-decorating sheet. In the simultaneous molding-decorating sheet, a high-luminance layer is provided on a base material film. The high-luminance layer contains high-luminance pigment in thermoplastic resin. In the simultaneous molding-decorating sheet, a single or plurality of heat-conduction prevention layers are laminated on the high-luminance layer. One of the plurality of heat-conduction prevention layers may be a patterned layer containing no high-luminance pigment. Each heat-conduction prevention layer can prevent heat of molding resin being melted and injected in a cavity from being conducted to the high-luminance layer at high temperature, thereby preventing melting of the resin of the high-luminance layer. The simultaneous molding-decorating sheet forms a resin molded product and simultaneously is bonded and integrated with a front surface thereof.

BRIEF SUMMARY OF THE INVENTION

According to one aspect, this specification discloses a lamination sheet including: a first layer made of resin and having optical transparency; a second layer made of resin and provided on a back side of the first layer; and a third layer made of resin and provided on a back side of the second layer, wherein the first layer has a thickness of 188 µm or larger, the second layer is a patterned layer, and the third layer has a thermal resistance value which is higher than a thermal resistance value of the second layer.

According to another aspect, this specification also discloses an insert molding body including the lamination sheet and a main molding body made of resin, wherein the lamination sheet covers a front surface of the main molding body while a back surface on the back side of the third layer contacts the front surface of the main molding body.

BRIEF DESCRIPTION OF THE DRAWINGS

FIG. 2 is a sectional side view schematically illustrating an exemplary schematic configuration of an insert molding body and a method of manufacturing the insert molding body. The upper part illustrates the insert molding body. The middle part (A) illustrates the lamination sheet before molding. The middle part (B) illustrates the lamination sheet after molding. The lower part illustrates an insert molding method and a state in which the lamination sheet illustrated in the middle part (B) is set to a mold.

DETAILED DESCRIPTION

Figure 1:
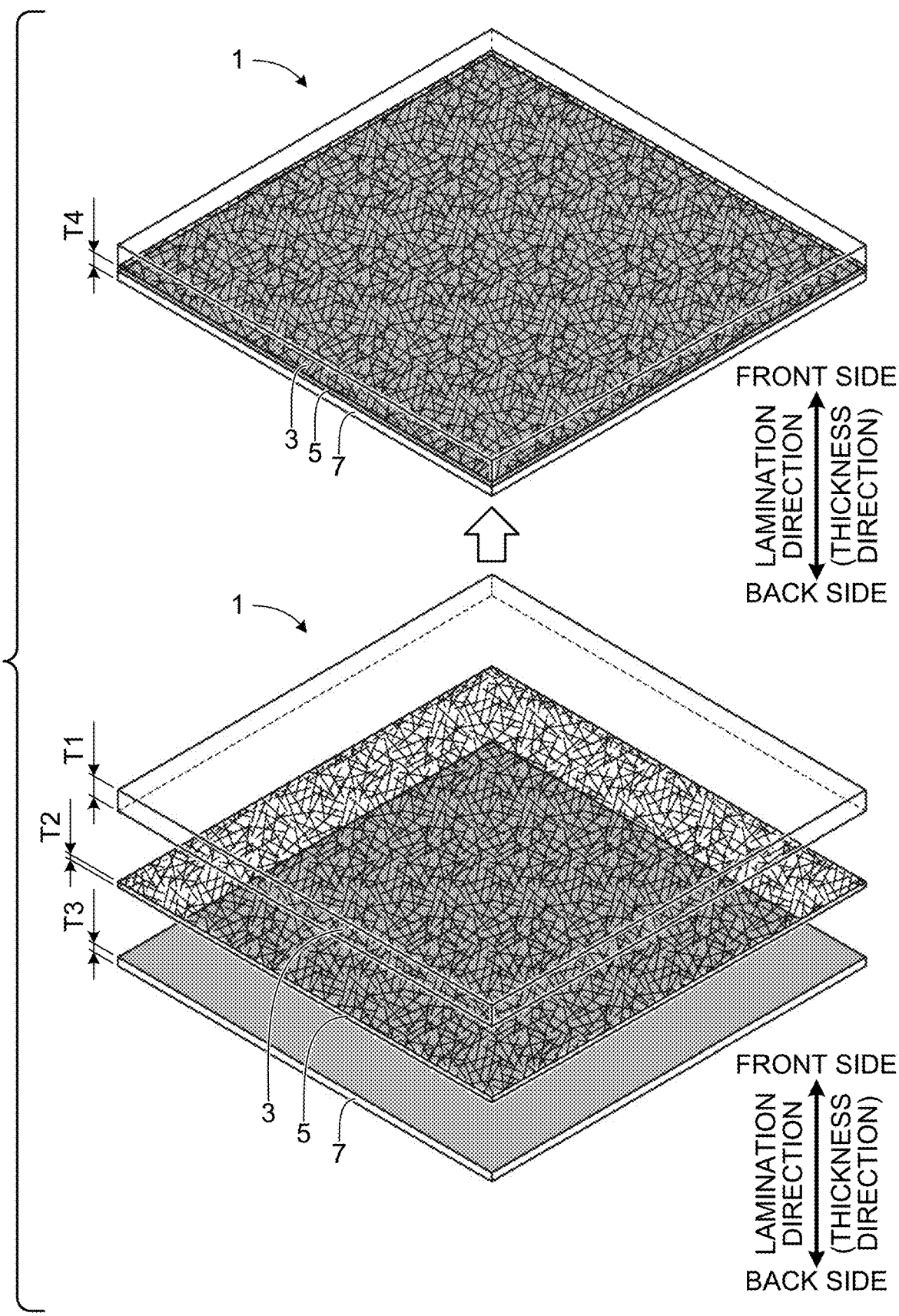
FIG. 1 is a perspective view schematically illustrating an exemplary schematic configuration of a lamination sheet. The upper part illustrates the lamination sheet. The lower part individually illustrates a first layer, a second layer, and a third layer of the lamination sheet.

The design properties are sometimes required for a molding body formed by resin molding. An insert molding body can have high design properties. Such an insert molding body is formed through insert molding of a lamination sheet. The lamination sheet has a configuration in which a first layer covers a second layer. When the first layer is made of resin and has optical transparency, a viewer of the insert molding body can visually recognize the second layer through a front surface of the insert molding body. The second layer is a patterned layer. The first layer reduces damage on the second layer and protects the second layer. It is possible to provide a stereoscopic design to the insert molding body by increasing a thickness of the first layer. Thus, the first layer is thick in some cases. For example, the first layer has a thickness of 188 µm or larger in some cases.

The inventor is aware that damage called gate flow is likely to occur to the insert molding body when the first layer is thick. The aforementioned damage is also called gate burning. The gate flow is attributable to the high temperature of resin having flowed into the cavity of a mold. The gate flow is a phenomenon that occurs when, for example, resin of which any of a plurality of layers is made melts at a part of the lamination sheet facing a gate of the mold. The gate is an inflow port through which the high-temperature resin flows into the cavity. At insert molding, the lamination sheet is set to the mold. In this case, the lamination sheet contacts the surface of the cavity at the first layer. When the first layer is thin, the aforementioned heat conducts to the mold. Thus, the first layer is not heated to a temperature at which damage occurs. However, the heat conduction to the mold decreases as the first layer is thicker. As a result, the first layer has high temperature and stores high-temperature heat. In particular, the first layer is abruptly heated at a position described next. The aforementioned position is a position at a part of the first layer near the gate as the inflow port of the high-temperature resin. The aforementioned position is also located at a back side of the first layer, which does not contact the surface of the cavity. The inventor carried out studies on a lamination sheet in which the gate flow is unlikely to occur when the first layer has a thickness of 188 µm or larger.

In view of the foregoing, it is an object of the present disclosure to provide a lamination sheet and an insert molding body that can prevent gate flow at insert molding.

An embodiment for performing the present disclosure will be described below with reference to the accompanying drawings. The present disclosure is not limited to configurations described below but may also employ various kinds of configurations in the same technical idea. For example, some of the configurations described below may be omitted or replaced with other configurations or the like. The present disclosure may include other configurations. Hatching in the drawings represents a section.

Lamination Sheet

The following describes a lamination sheet 1 with reference to FIG. 1. The lamination sheet 1 includes a first layer 3, a second layer 5, and a third layer 7. In the lamination sheet 1, the second layer 5 is provided on a back side of the first layer 3, and the third layer 7 is provided on a back side of the second layer 5. In the embodiment, the lamination sheet 1 is a laminated body obtained by laminating the first layer 3, the second layer 5, and the third layer 7. Thus, a back surface on the back side of the first layer 3 contacts a front surface of the second layer 5, and a back surface on the back side of the second layer 5 contacts a front surface of the third layer 7. In this case, the lamination sheet 1 is manufactured by, for example, forming the second layer 5 on the back surface of the first layer 3, and thereafter forming the third layer 7 on the back surface of the second layer 5. The lamination sheet may be a laminated body further including one or a plurality of layers different from the first layer 3, the second layer 5, and the third layer 7. The first layer 3, the second layer 5, and the third layer 7 will be described below.

In the embodiment, the "back side" in the above description is one side in a lamination direction in which the first layer 3, the second layer 5, and the third layer 7 are laminated in the lamination sheet 1. The lamination direction is same as a thickness direction of the lamination sheet 1. In each of the lamination sheet 1, the first layer 3, the second layer 5, and the third layer 7, the front surface is a surface on the front side in the lamination direction, and the back surface is a surface on the back side in the lamination direction. The front side in the lamination direction is the other side in the lamination direction, which is opposite to the back side.

In the embodiment, a laminated body means a composite layer made of resin and formed by laminating two or more of resin layers. In this case, the laminated layers may be layers having resin compositions different from each other or may be layers having identical resin compositions. In the embodiment, a composite body means a resin single layer made of a composite of two or more kinds of resin. In this case, the aforementioned laminated body may be a composite layer made of resin and formed by laminating two or more composite bodies.

First Layer

The first layer 3 is an object made of resin and having a sheet or film shape. For example, the first layer 3 may employ a well-known film already practically used. However, for example, the first layer 3 may be uniquely formed by curing resin. The first layer 3 has optical transparency. In the first layer 3, the optical transmittance is preferably 80% or higher in the wavelength range of 400 nm to 700 nm. In the lamination sheet 1, the second layer 5 can be visually recognized through the first layer 3, and moreover, the thicknesses of the first layer 3 and the second layer 5 can be visually recognized. The method of measuring the optical transmittance will be described later.

The first layer 3 may be colored. When the first layer 3 is colored, the first layer 3 preferably has a state described next. The aforementioned state is a state in which the optical transmittance satisfies the above-described condition and the optical transparency is not degraded. When the first layer 3 is colored, the range of coloring may be part or the entire of the first layer 3. When the range of coloring is part of the first layer 3, one or a plurality of places may be colored. When a plurality of places are colored, the places may be colored in an identical color or in colors different from each other. When the range of coloring is the entire first layer 3, the entire range may be colored in an identical color or a plurality of colors different from each other. The first layer 3 may be colored by using one or more kinds of pigment or dye. When one or both of weather resistance and light resistance are required for the lamination sheet 1, the first layer 3 is preferably colored by using pigment.

The resin of which the first layer 3 is made may employ thermoplastic resin or thermosetting resin. Examples of the thermoplastic resin include acrylic resin, polycarbonate resin, polyethylene terephthalate resin, polybutyl terephthalate resin, acrylic nitrile butadiene styrene resin, polyethylene resin, polypropylene resin, polystyrene resin, and polyvinyl chloride resin. Examples of the thermosetting resin include polyurethane resin and unsaturated polyester resin. The first layer 3 may be a single layer made of one of the aforementioned kinds of resin. The first layer 3 may be a composite body made of two or more of the aforementioned kinds of resin, or may be a laminated body made of one of the aforementioned kinds of resin or two or more of the aforementioned kinds of resin.

When the first layer 3 is made of thermoplastic resin as described above or is a composite body or laminated body of thermoplastic resins as described above, it is easy to perform thermoforming. The resin of which the first layer 3 is made may contain one or more kinds of additives. Examples of the additives include a dispersant, a thermal stabilizer, a thermal radical polymerization inhibitor, an optical stabilizer, an oxidation preventive, a preservative, a pH adjuster, a defoamer, and a penetrant. Whether to add an additive to the resin of which the first layer 3 is made is determined as appropriate with various conditions taken into account. When an additive is added to the resin of which the first layer 3 is made, the kind of the additive is determined as appropriate with various conditions taken into account.

Second Layer

The second layer 5 is an object made of resin and having a sheet or film shape. The second layer 5 is also a patterned layer. For example, the second layer 5 may be formed by a printing method. Examples of the printing method include screen printing, gravure printing, and ink jet printing. The inventor thinks that the ink jet printing is preferable as the printing method of forming the second layer 5. The ink jet printing can print a pattern at high definition. The pattern of the second layer 5 illustrated in FIG. 1 is exemplary. The pattern of the second layer 5 is determined as appropriate in accordance with a design required for the lamination sheet 1.

In the second layer 5, the pattern drawing range may be part or the entire of the second layer 5. When the drawing range is part of the second layer 5, patterns may be provided at one or a plurality of places. When patterns are provided at a plurality of places, the patterns may be different from each other between the places. When the drawing range is the entire second layer 5, an identical pattern or a plurality of patterns different from each other may be drawn on the entire second layer 5.

The resin of which the second layer 5 is made may employ ionizing radiation curable resin. Examples of the ionizing radiation curable resin include ultraviolet curable resin and electron beam curable resin. In the lamination sheet 1, the ionizing radiation curable resin may be resin containing an acrylic functional group. The inventor thinks that acrylic ultraviolet curable resin is preferable. The acrylic ultraviolet curable resin is highly versatile. A wide variety of curable resins can be obtained from the acrylic ultraviolet curable resin. The acrylic ultraviolet curable resin contains a photopolymerization initiator, a reactive monomer, and a reactive oligomer. In the acrylic ultraviolet curable resin, the photopolymerization initiator becomes radicals through ultraviolet irradiation, and the radicals activate functional groups of the reactive monomer and the reactive oligomer. Accordingly, the functional groups connect one after another in chains and turn into a polymer (acrylic resin).

In the second layer 5, the ionizing radiation curable resin may contain one or more kinds of additives. Such an additive is, for example, a sensitizer. The sensitizer promotes initiation reaction of the photopolymerization initiator. Other examples of the additives include a dispersant, a thermal stabilizer, a thermal radical polymerization inhibitor, an oxidation preventive, a preservative, a pH adjuster, a defoamer, and a penetrant. Whether to add an additive to the ionizing radiation curable resin is determined as appropriate with various conditions taken into account. When an additive is added to the ionizing radiation curable resin, the kind of the additive is determined as appropriate with various conditions taken into account.

In the second layer 5, the ionizing radiation curable resin of which a pattern is made contains one or more kinds of pigment or dye. The pigment may be organic pigment or inorganic pigment. Examples of the organic pigment include nitrosos, dyeing lakes, azo lakes, insoluble azos, monoazos, disazos, condensed azos, benzimidazolones, phthalocyanines, anthraquinones, perylenes, quinacridones, dioxazines, isoindolines, azo methines, and pyrrolopyrroles. Examples of the inorganic pigment include, oxides, hydroxides, sulfides, ferrocyanides, chromates, carbonates, silicates, phosphates, carbons (carbon black), and metallic powders. When one or both of weather resistance and light resistance are required for the lamination sheet 1, the pattern of the second layer 5 is preferably formed by using pigment.

The second layer 5 preferably has optical transparency. The second layer 5 preferably has an optical transmittance of 40% or higher in the wavelength range of 400 nm to 700 nm in any pattern drawing range. The second layer 5 may be a composite body or a laminated body.

Third Layer

The third layer 7 is an object made of resin and having a sheet or film shape. For example, similarly to the second layer 5, the third layer 7 may be formed by a printing method. The inventor thinks that silk printing is preferable as the printing method of forming the third layer 7. The thickness of the third layer 7 can be easily adjusted by the silk printing, which leads to increased productivity of the third layer 7. The silk printing can achieve printing cost reduction.

The resin of which the third layer 7 is made may employ, for example, polyester resin, acrylic resin, or vinyl chloride resin. The third layer 7 may be a composite body made of two or more of the aforementioned kinds of resin, or may be a laminated body made of one of the aforementioned kinds of resin or two or more of the aforementioned kinds of resin. The resin of which the third layer 7 is made contains one or more kinds of pigment or dye. The pigment may be organic pigment or inorganic pigment. Examples of the organic pigment and the inorganic pigment include the materials described above for the second layer 5. When one or both of weather resistance and light resistance are required for the lamination sheet 1, the third layer 7 is preferably colored by using pigment.

The pigment preferably includes pigment having a glittering property. Accordingly, the lamination sheet 1 can have glittering appearance. Examples of the pigments having a glittering property include metallic pigment and pearl pigment. The metallic pigment can develop metallic-tone luster. The pearl pigment can develop pearl-tone luster. Examples of the metallic pigment include powder and flakes of metal (alloy). Examples of the aforementioned metal (alloy) include aluminum, copper, and brass. Other examples of the metallic pigment include minute cut pieces of a metal evaporation-coated film. Examples of the pearl pigment include natural mica covered with one layer or two or more layers of metallic oxide, and synthesis mica covered with one layer or two or more layers of metallic oxide. Examples of the metallic oxide include titanium oxide, silicon oxide, and iron oxide. Other examples of the pearl pigment include minute cut pieces of a film described next. The aforementioned film is a film obtained by laminating two or more resin layers having optical refractive indexes different from each other. Still other examples of the pearl pigment include pearl powder, powder of the inner wall of a seashell, and argentine.

The resin of which the third layer 7 is made may contain one or more kinds of additives. Examples of the additives include a dispersant, a thermal stabilizer, an oxidation preventive, a preservative, a pH adjuster, a defoamer, and a penetrant. Whether to add an additive to the resin of which the third layer 7 is made is determined as appropriate with various conditions taken into account. When an additive is added to the resin of which the third layer 7 is made, the kind of the additive is determined as appropriate with various conditions taken into account.

The third layer 7 is preferably a colored layer. For example, the third layer 7 is preferably an entirely solidly colored layer. However, the third layer 7 may be a colored layer different from a solid layer. For example, the third layer 7 may be a colored layer colored in various patterns. Examples of the aforementioned patterns include a stripe pattern, a border pattern, and a lattice pattern. When the third layer 7 is a laminated body, layers of the third layer 7 may be layers colored in different manners. The coloring manner of the third layer 7 is determined as appropriate in accordance with a design required for the lamination sheet 1. The third layer 7 preferably has optical transparency lower than that of the second layer 5. The third layer 7 is preferably has an optical transmittance of 5% or lower in the wavelength range of 400 nm to 700 nm. The optical transmittance of the third layer 7 is more preferably 0%. In other words, the third layer 7 is preferably a colored layer having no optical transparency. The third layer 7 can provide masking to the lamination sheet 1. A method of measuring the optical transmittance will be described later.

Thicknesses of First, Second, and Third Layers

The following describes the thicknesses of the first layer 3, the second layer 5, and the third layer 7. In the embodiment, the thickness of the first layer 3 is referred to as a "first thickness T1", the thickness of the second layer 5 is referred to as a "second thickness T2", and the thickness of the third layer 7 is referred to as a "third thickness T3" (refer to the lower part of FIG. 1). The total thickness of the second layer 5 and the third layer 7 is referred to as a "total thickness T4" (T4=T2+T3) (refer to the upper part of FIG. 1). In the lamination sheet 1, the relation between the first thickness T1 and the total thickness T4 is set to be "T1>T4". In other words, the first layer 3 is a layer, the first thickness T1 of which is larger than the total thickness T4.

In the lamination sheet 1, the first thickness T1 is set to be 188 μm or larger. In other words, the first layer 3 is a layer, the first thickness T1 of which is 188 μm or larger. The first layer 3 is preferably a layer, the first thickness T1 of which is 250 μm or larger. The first layer 3 is more preferably a layer, the first thickness T1 of which is 300 μm or larger. However, the first layer 3 is preferably a layer, the first thickness T1 of which is 500 μm or smaller. When a layer corresponding to the first layer 3 on the front side in the lamination sheet is a layer having a large thickness of 188 μm or larger like the first thickness T1, generation of gate flow at insert molding needs to be taken care of. However, the lamination sheet 1 achieves effects described later. Thus, according to the lamination sheet 1, it is possible to prevent generation of gate flow at insert molding.

In the lamination sheet 1, the second thickness T2, the third thickness T3, and the total thickness T4 are set as described next. That is, the second thickness T2 is set to be a predetermined value in the range of 10 μm to 100 μm. The third thickness T3 is set to be a predetermined value in the range of 60 μm to 150 μm. The total thickness T4 is set to be a predetermined value of 85 μm or larger that satisfies the above-described relation of "T1>T4". The total thickness T4 is preferably set to be a predetermined value of 100 μm or larger that satisfies the above-described relation of "T1>T4". In other words, the second layer 5 is a layer, the second thickness T2 of which has a predetermined value in the range of 10 μm to 100 μm. The third layer 7 is a layer, the third thickness T3 of which has a predetermined value in the range of 60 μm to 150 μm. The total thickness T4 of the second layer 5 and the third layer 7 has a predetermined value smaller than the first thickness T1 and equal to or larger than 85 μm. The second layer 5 and the third layer 7 are preferably layers, the total thickness T4 of which has a predetermined value smaller than the first thickness T1 and equal to or larger than 100 μm.

In the lamination sheet 1, the relation between the first thickness T1 and the second thickness T2 is set to be "T1>T2", and the relation between the first thickness T1 and the third thickness T3 is set to be "T1>T3". In other words, the first layer 3 is a layer thicker than each of the second layer 5 and the third layer 7.

Thermal Resistance Values of First, Second, and Third Layers

The following describes the thermal resistance values of the first layer 3, the second layer 5, and the third layer 7. In the embodiment, the thermal resistance value of the first layer 3 is referred to as a "first thermal resistance value R1". The thermal resistance value of the second layer 5 is referred to as a "second thermal resistance value R2", and the thermal conductivity of the second layer 5 is referred to as a "second thermal conductivity λ2". The thermal resistance value of the third layer 7 is referred to as a "third thermal resistance value R3", and the thermal conductivity of the third layer 7 is referred to as a "third thermal conductivity λ3". In each of the first layer 3, the second layer 5, and the third layer 7, the relation among the thermal resistance value (R), the thickness (T), and the thermal conductivity (λ) is expressed by "R=T/λ". In the aforementioned expression, "R, T, and λ" are "R1, T1, and λ1", "R2, T2, and λ2", or "R3, T3, and λ3". The value "λ1" represents the thermal conductivity (first thermal conductivity) of the first layer 3. A thermal resistance value as the sum of the second thermal resistance value R2 and the third thermal resistance value R3 is referred to as a "total thermal resistance value R4" (R4=R2+R3).

In the lamination sheet 1, the first thermal resistance value R1 is preferably set to be equal to or larger than $1000 \times 10^{-6}$ m²·K/W. In other words, the first layer 3 is preferably a layer, the first thermal resistance value R1 of which is $1000 \times 10^{-6}$ m²·K/W or larger.

In the lamination sheet 1, the third thermal resistance value R3 is set to be higher than the second thermal resistance value R2. In other words, the third layer 7 is a layer, the thermal resistance value of which is higher than that of the second layer 5. In the lamination sheet 1, the second layer 5 and the third layer 7 are preferably layers, the total thermal resistance value R4 of which is $500 \times 10^{-6}$ m²·K/W or larger.

Combination of Second Layer and Third Layer

Table 1 lists 12 specific examples of the combination of the second layer 5 and the third layer 7 in the lamination sheet 1. The specific examples 1 to 12 are examples in which the second layer 5 is made of acrylic resin, and the third layer 7 is made of polyurethane resin. Thus, in Table 1, the second thermal resistance value R2 is a value calculated based on the above-described expression (R2=T2/λ2) with the second thermal conductivity λ2 taken to be 0.25 W/m·K, and the third thermal resistance value R3 is a value calculated based on the above-described expression (R3=T3/λ3) with the third thermal conductivity λ3 taken to be 0.21 W/m·K. The second thermal conductivity λ2 of 0.25 W/m·K and the third thermal conductivity λ3 of 0.21 W/m·K are values measured according to a cyclic heating method. However, each aforementioned value is exemplary and may differ as appropriate in accordance with specification and the like for resin of the same kind. The specific examples 1 to 12 are exemplary. In the lamination sheet 1, the second layer 5 and the third layer 7 are not limited to the specific examples 1 to 12.

TABLE 1

|  | SPECIFIC EXAMPLE | | | | | |
|---|---|---|---|---|---|---|
|  | 1 | 2 | 3 | 4 | 5 | 6 |
| SECOND THICKNESS T2 (μm) | 10 | 20 | 30 | 40 | 50 | 60 |
| SECOND THERMAL RESISTANCE VALUE R2 ($10^{-6}$ m² · K/W) | 40 | 80 | 120 | 160 | 200 | 240 |
| THIRD THICKNESS T3 (μm) | 100 | 90 | 80 | 75 | 70 | 60 |
| THIRD THERMAL RESISTANCE VALUE R3 ($10^{-6}$ m² · K/W) | 476 | 429 | 381 | 357 | 333 | 286 |
| TOTAL THICKNESS T4 (μm) | 110 | 110 | 110 | 115 | 120 | 120 |
| TOTAL THERMAL RESISTANCE VALUE R4 ($10^{-6}$ m² · K/W) | 516 | 509 | 501 | 517 | 533 | 526 |

TABLE 1-continued

|  | SPECIFIC EXAMPLE | | | | | |
| --- | --- | --- | --- | --- | --- | --- |
|  | 7 | 8 | 9 | 10 | 11 | 12 |
| SECOND THICKNESS T2 (μm) | 70 | 80 | 90 | 100 | 40 | 70 |
| SECOND THERMAL RESISTANCE VALUE R2 ($10^{-6}$ $m^2 \cdot K/W$) | 280 | 320 | 360 | 400 | 160 | 280 |
| THIRD THICKNESS T3 (μm) | 60 | 70 | 80 | 85 | 110 | 75 |
| THIRD THERMAL RESISTANCE VALUE R3 ($10^{-6}$ $m^2 \cdot K/W$) | 286 | 333 | 381 | 405 | 524 | 357 |
| TOTAL THICKNESS T4 (μm) | 130 | 150 | 170 | 185 | 150 | 145 |
| TOTAL THERMAL RESISTANCE VALUE R4 ($10^{-6}$ $m^2 \cdot K/W$) | 566 | 653 | 741 | 805 | 684 | 637 |

Method of Measuring Optical Transmittance

The optical transmittances described above for the first layer 3, the second layer 5, and the third layer 7 are measured by a method described next. That is, the first layer 3 having the first thickness T1, the second layer 5 having the second thickness T2, and the third layer 7 having the third thickness T3 are individually produced as measurement samples. The number of measurement samples is 10 for each of the first layer 3, the second layer 5, and the third layer 7. Subsequently, a spectrum of the optical transmittance is measured with the 10 measurement samples of each layer by using a spectrophotometer. This measurement is performed in the wavelength range of 400 nm to 700 nm. The spectrophotometer may be CM-3600d manufactured by Konica Minolta, Inc. The average value of measurement values of the 10 measurement samples is calculated for each of the first layer 3, the second layer 5, and the third layer 7. Accordingly, each average value is measured as the optical transmittance of the corresponding one of the first layer 3, the second layer 5, and the third layer 7. That is, the average value of the measurement samples corresponding to the first layer 3 is obtained as the optical transmittance of the first layer 3. The average value of the measurement samples corresponding to the second layer 5 is obtained as the optical transmittance of the second layer 5. The average value of the measurement samples corresponding to the third layer 7 is obtained as the optical transmittance of the third layer 7.

Insert Molding Body

The following describes an insert molding body 10 with reference to FIG. 2. The insert molding body 10 includes the lamination sheet 1 and a main molding body 12 (refer to the upper part of FIG. 2). In the insert molding body 10, the lamination sheet 1 covers a front surface of the main molding body 12 in a state described next. The aforementioned state is a state in which the back surface of the third layer 7 contacts the front surface of the main molding body 12. The front surface of the lamination sheet 1 (the front surface of the first layer 3) serves as the front surface of the insert molding body 10.

The insert molding body 10 is formed by insert molding. Before the insert molding, the lamination sheet 1 may be preformed into a shape along the product shape of the insert molding body 10 (refer to the middle part of FIG. 2). A molding method employed as the preforming is, for example, thermoforming. Examples of the thermoforming include vacuum forming and pressure forming. In this case, the lamination sheet 1 being formed into a shape along the product shape of the insert molding body 10 is set to molds 20 and 21 (refer to the lower part of FIG. 2). In the embodiment, the lamination sheet 1 contacts, at the front surface of the first layer 3, an inner surface of the mold 20 forming a cavity 22. Thereafter, resin is injected into the cavity 22 inside the molds 20 and 21. The resin has flowability and flows into the cavity 22 through a gate 23 at high temperature and fast speed. The resin collides with the back surface of the third layer 7 at a part P of the lamination sheet 1 facing the gate 23, and fills the entire cavity 22.

In the lower part of FIG. 2, the molds 20 and 21 are disposed in a state in which their mold clamping direction is aligned with the up-down direction (vertical direction) in a front view of the sheet of FIG. 2, and the resin injection direction is set to be a direction from the lower side to the upper side. However, such disposition of the molds 20 and 21, the mold clamping direction, and the injection direction are exemplary. For example, the insert molding may be performed while the mold clamping direction and the injection direction are horizontal. The insert molding may be performed while the lower part of FIG. 2 is vertically inverted. The insert molding is a well-known resin molding method. Thus, other description related to the insert molding is omitted.

The resin of which the main molding body 12 is made may employ thermoplastic resin. Examples of the thermoplastic resin include polyolefin resin, polystyrene resin, polyvinyl chloride resin, acrylic resin, polyacetal resin, polyester resin, polyamide resin, polycarbonate resin, polyphenylene sulfide resin, and polyimide resin. Examples of the polyolefin resin include polyethylene and polypropylene. Examples of the acrylic resin include polymethyl methacrylate. Examples of the polyester resin include polyethylene terephthalate and polybutylene terephthalate. The thermoplastic resin of which the main molding body 12 is made may be one of the aforementioned kinds of resin or a composite material obtained by mixing two or more of the aforementioned kinds of resin.

Example

The inventor performed experiment to check a point described next. The aforementioned point is such a point that, in the lamination sheet 1 of the above-described embodiment, the second layer 5 and the third layer 7 effectively function against high-temperature resin at insert molding. The following describes the overview of the experiment thus performed. In the description, for clear correspondence to the above description, each component is denoted by a reference sign same as that in the above description. However, the reference signs of the lamination sheet and the insert molding body are omitted.

Experiment Method

In the experiment, samples 1 to 10 were to be evaluated, and a total of 10 of insert molding bodies in each of which the front surface of the main molding body 12 was covered with the lamination sheet of one of the samples 1 to 10 were produced. The insert molding body was produced by a method according to the above-described method. Thereafter, it was checked whether gate flow occurred in the 10 insert molding bodies.

Each of the samples 1 to 6 is a lamination sheet, the first thickness T1 of which is 188 μm or larger and the third layer 7 of which is a layer having a thermal resistance value higher than that of the second layer 5 (R3>R2), and corresponds to the lamination sheet 1 of the embodiment. Each of the samples 1 to 6 is also a lamination sheet, the total thermal resistance value R4 of which is $500 \times 10^{-6}$ m$^2$·K/W or larger. Each of the samples 7 to 9 is a lamination sheet including no second layer 5. The sample 10 is a lamination sheet, the third layer 7 of which is a layer having a thermal resistance value lower than that of the second layer 5 (R3<R2). Each of the samples 7 to 10 is also a lamination sheet, the total thermal resistance value R4 of which is smaller than $500 \times 10^{-6}$ m$^2$·K/W. In the samples 1 to 10, the first layer 3 has a single-layer structure or a double-layer structure. In the present description, each layer of the first layer 3 is referred to as a "first layer A", a "first layer B", or a "first layer C". The resin of which the first layer A is made is acrylic resin. The resin of which the first layer B is made is polycarbonate resin. The resin of which the first layer C is made is polymer alloy resin. In the samples 1 to 10, the resin of which the second layer 5 is made is acrylic resin, and the resin of which the third layer 7 is made is polyurethane resin.

In the samples 1 and 7, the first layer 3 has a single-layer structure (single layer) of the first layer B. In the sample 7, the second layer 5 is omitted. In the sample 1, the back surface of the first layer B contacts the front surface of the second layer 5. In the sample 7, the back surface of the first layer B contacts the front surface of the third layer 7.

In the samples 2, 3, 8, and 9, the first layer 3 has a double-layer structure (double-layer laminated body) of the first layers A and C. The first layer C is provided on the back side of the first layer A. In the samples 8 and 9, the second layer 5 is omitted. In the samples 2 and 3, the back surface of the first layer C contacts the front surface of the second layer 5. In the samples 8 and 9, the back surface of the first layer C contacts the front surface of the third layer 7.

In the sample 4, the first layer 3 has a double-layer structure (double-layer laminated body) of the first layers A and B. The first layer B is provided on the back side of the first layer A, and the back surface of the first layer B contacts the front surface of the second layer 5.

In the samples 5, 6, and 10, the first layer 3 has a single-layer structure (single layer) of the first layer C. The back surface of the first layer C contacts the front surface of the second layer 5.

In the samples 1 to 10, the thicknesses of the first layers A, B, and C, and the first thickness T1, the second thickness T2 and the second thermal resistance value R2 of the second layer 5, the third thickness T3 and the third thermal resistance value R3 of the third layer 7, the total thickness T4, and the total thermal resistance value R4 are as listed in Table 2. Although not described in Table 2, when the first layer 3 has a single-layer structure (refer to the samples 1, 5 to 7, and 10), the first thermal resistance value R1 is the thermal resistance value of the one layer as the first layer 3. When the first layer 3 has a double-layer structure (refer to samples 2 to 4, 8, and 9) or a structure of three or more layers (description thereof is omitted), the first thermal resistance value R1 is the sum of the thermal resistance values of the layers of the first layer 3. The thermal resistance value of each layer of the first layer 3 can be calculated as described above based on the above-described expression (R=T/λ).

In Table 2, the second thermal resistance value R2, the third thermal resistance value R3, and the total thermal resistance value R4 are values calculated as described next. That is, the second thermal resistance value R2 is a value calculated based on the above-described expression (R2=T2/λ2) with the second thermal conductivity λ2 taken to be 0.25 W/m·K. The third thermal resistance value R3 is a value calculated based on the above-described expression (R3=T3/λ3) with the third thermal conductivity λ3 taken to be 0.21 W/m·K. The total thermal resistance value R4 is the sum of the second thermal resistance value R2 and the third thermal resistance value R3 (R4=R2+R3). For example, the thermal conductivity of the acrylic resin of which the first layer A is made is 0.25 W/m·K like the second thermal conductivity λ2, and the thermal conductivity of the polycarbonate resin of which the first layer B is made is 0.19 W/m·K.

TABLE 2

| | SAMPLE | | | | |
|---|---|---|---|---|---|
| | 1 | 2 | 3 | 4 | 5 |
| FIRST LAYER A THICKNESS (μm) | — | 25 | 40 | 25 | — |
| FIRST LAYER B THICKNESS (μm) | 400 | — | — | 375 | — |
| FIRST LAYER C THICKNESS (μm) | — | 375 | 460 | — | 500 |
| FIRST THICKNESS T1 (μm) | 400 | 400 | 500 | 400 | 500 |
| SECOND THICKNESS T2 (μm) | 40 | 40 | 40 | 70 | 70 |
| SECOND THERMAL RESISTANCE VALUE R2 ($10^{-6}$ m$^2$ · K/W) | 160 | 160 | 160 | 280 | 280 |
| THIRD THICKNESS T3 (μm) | 75 | 75 | 110 | 75 | 75 |
| THIRD THERMAL RESISTANCE VALUE R3 ($10^{-6}$ m$^2$ · K/W) | 357 | 357 | 524 | 357 | 357 |
| TOTAL THICKNESS T4 (μm) | 115 | 115 | 150 | 145 | 145 |
| TOTAL THERMAL RESISTANCE VALUE R4 ($10^{-6}$ m$^2$ · K/W) | 517 | 517 | 684 | 637 | 637 |

| | SAMPLE | | | | |
|---|---|---|---|---|---|
| | 6 | 7 | 8 | 9 | 10 |
| FIRST LAYER A THICKNESS (μm) | — | — | 25 | 40 | — |
| FIRST LAYER B THICKNESS (μm) | — | 375 | — | — | — |
| FIRST LAYER C THICKNESS (μm) | 200 | — | 335 | 330 | 315 |
| FIRST THICKNESS T1 (μm) | 200 | 375 | 360 | 370 | 315 |
| SECOND THICKNESS T2 (μm) | 70 | — | — | — | 70 |
| SECOND THERMAL RESISTANCE VALUE R2 ($10^{-6}$ m$^2$ · K/W) | 280 | — | — | — | 280 |
| THIRD THICKNESS T3 (μm) | 75 | 75 | 75 | 100 | 30 |
| THIRD THERMAL RESISTANCE VALUE R3 ($10^{-6}$ m$^2$ · K/W) | 357 | 357 | 357 | 476 | 143 |
| TOTAL THICKNESS T4 (μm) | 145 | 75 | 75 | 100 | 100 |
| TOTAL THERMAL RESISTANCE VALUE R4 ($10^{-6}$ m$^2$ · K/W) | 637 | 357 | 357 | 476 | 423 |

Experimental Result

In each of the samples 1 to 6, no gate flow occurred to the insert molding body. However, in each of the samples 7 to 10, gate flow occurred to the insert molding body. Accordingly, a point described next was confirmed. The aforementioned point is such a point that, in the lamination sheet 1 of the embodiment described above, the second layer 5 and the third layer 7 effectively function against high-temperature resin at insert molding, thereby preventing gate flow in the insert molding body 10.

Effects of Embodiment

According to the embodiment, it is possible to obtain effects as follows.

(1) The lamination sheet 1 includes the first layer 3, the second layer 5, and the third layer 7 (refer to FIG. 1). The first layer 3 is a layer made of resin and having optical transparency. The second layer 5 is a layer made of resin and provided on the back side of the first layer 3. The third layer 7 is a layer made of resin and provided on the back side of the second layer 5. In the lamination sheet 1, the first layer 3 is a layer, the first thickness T1 of which is 188 μm or larger. The first layer 3 is a layer, the first thickness T1 of which is larger than the total thickness T4. The second layer 5 is a patterned layer. The third layer 7 is a layer, the thermal resistance value of which is higher than that of the second layer 5.

Thus, the third layer 7 can function as a heat-insulating layer at insert molding (refer to the lower part of FIG. 2). The third layer 7 reduces heat conduction toward the second layer 5 and the first layer 3. Temperature increase of the first layer 3 can be prevented to protect the first layer 3 from high-temperature resin at insert molding. It is possible to prevent gate flow in the lamination sheet 1 at insert molding. The second layer 5 can provide design properties to the lamination sheet 1. The first layer 3 can provide a sense of depth to the lamination sheet 1. In addition, the first layer 3 can function as a damage protection layer. The first layer 3 can prevent damage on the second layer 5.

(2) The second layer 5 and the third layer 7 are layers, the total thermal resistance value R4 of which is 500×10–6 m2·K/W or larger. Thus, the second layer 5 and the third layer 7 can function as heat-insulating layers at insert molding. The second layer 5 and the third layer 7 can protect the first layer 3 from high-temperature resin at insert molding.

(3) The second layer 5 is a patterned layer having optical transparency, and the third layer 7 is a colored layer (refer to FIG. 1). Thus, the first layer 3 and the second layer 5 can provide a sense of depth to the lamination sheet 1. The third layer 7 in a state described next can provide masking to the lamination sheet 1. The aforementioned state is a state in which the third layer 7 is entirely a colored layer having no optical transparency.

(4) The insert molding body 10 includes the lamination sheet 1 and the main molding body 12 (refer to the upper part of FIG. 2). In the insert molding body 10, the lamination sheet 1 covers the front surface of the main molding body 12 while the back surface of the third layer 7 contacts the front surface of the main molding body 12. Thus, no gate flow can occur to the insert molding body 10. It is possible to increase the design properties of the insert molding body 10. It is possible to provide a sense of depth to the insert molding body 10. When the insert molding body 10 is used or when a product including the insert molding body 10 is used, the first layer 3 can prevent damage on the second layer 5.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A lamination sheet comprising:
a first layer made of resin and having optical transparency;
a second layer made of resin and provided on a back side of the first layer; and
a third layer made of resin and provided on a back side of the second layer, wherein the first layer has a thickness of 188 μm or larger, the second layer is a patterned layer, and the third layer has a thermal resistance value which is higher than a thermal resistance value of the second layer.

2. The lamination sheet according to claim 1, wherein the first layer is a single layer.

3. The lamination sheet according to claim 1, wherein the first layer has a thickness larger than a total thickness of the second layer and the third layer.

4. The lamination sheet according to claim 2, wherein the first layer has a thickness larger than a total thickness of the second layer and the third layer.

5. The lamination sheet according to claim 1, wherein a sum of the thermal resistance values of the second layer and the third layer, which is a total thermal resistance value, is $500 \times 10^{-6}$ m$^2$K/W or larger.

6. The lamination sheet according to claim 2, wherein a sum of the thermal resistance values of the second layer and the third layer is $500 \times 10^{-6}$ m$^2$K/W or larger, the sum being a total resistance value.

7. The lamination sheet according to claim 3, wherein a sum of the thermal resistance values of the second layer and the third layer is $500 \times 10^{-6}$ m$^2 \cdot$K/W or larger, the sum being a total resistance value.

8. The lamination sheet according to claim 4, wherein a sum of the thermal resistance values of the second layer and the third layer is $500 \times 10^{-6}$ m$^2 \cdot$K/W or larger, the sum being a total resistance value.

9. The lamination sheet according to claim 1, wherein the second layer has optical transparency, and the third layer is a colored layer.

10. The lamination sheet according to claim 2, wherein the second layer has optical transparency, and the third layer is a colored layer.

11. The lamination sheet according to claim 3, wherein the second layer has optical transparency, and the third layer is a colored layer.

12. The lamination sheet according to claim 4, wherein the second layer has optical transparency, and the third layer is a colored layer.

13. The lamination sheet according to claim 5, wherein the second layer has optical transparency, and the third layer is a colored layer.

14. The lamination sheet according to claim 6, wherein the second layer has optical transparency, and the third layer is a colored layer.

15. The lamination sheet according to claim 7, wherein the second layer has optical transparency, and the third layer is a colored layer.

16. An insert molding body comprising:
the lamination sheet according to claim 1; and
a main molding body made of resin,
wherein the lamination sheet covers a front surface of the main molding body while a back surface on the back side of the third layer contacts the front surface of the main molding body.

17. An insert molding body comprising:
the lamination sheet according to claim 3; and
a main molding body made of resin,
wherein the lamination sheet covers a front surface of the main molding body while a back surface on the back side of the third layer contacts the front surface of the main molding body.

18. An insert molding body comprising:
the lamination sheet according to claim 3; and a main molding body made of resin,
wherein the lamination sheet covers a front surface of the main molding body while a back surface on the back side of the third layer contacts the front surface of the main molding body.

19. An insert molding body comprising:
the lamination sheet according to claim 5; and
a main molding body made of resin,
wherein the lamination sheet covers a front surface of the main molding body while a back surface on the back side of the third layer contacts the front surface of the main molding body.

20. An insert molding body comprising:
the lamination sheet according to claim 9; and
a main molding body made of resin,
wherein the lamination sheet covers a front surface of the main molding body while a back surface on the back side of the third layer contacts the front surface of the main molding body.

\* \* \* \* \*